(12) United States Patent
Sridhara et al.

(10) Patent No.: US 10,013,857 B2
(45) Date of Patent: Jul. 3, 2018

(54) USING HAPTIC TECHNOLOGIES TO PROVIDE ENHANCED MEDIA EXPERIENCES

(75) Inventors: Vinay Sridhara, Santa Clara, CA (US); Saumitra Mohan Das, San Jose, CA (US); Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 13/594,502

(22) Filed: Aug. 24, 2012

(65) Prior Publication Data
US 2013/0227410 A1 Aug. 29, 2013

Related U.S. Application Data

(60) Provisional application No. 61/578,685, filed on Dec. 21, 2011.

(51) Int. Cl.
*G06F 3/00* (2006.01)
*G08B 6/00* (2006.01)
(Continued)

(52) U.S. Cl.
CPC ............ *G08B 6/00* (2013.01); *H04N 21/235* (2013.01); *H04N 21/4131* (2013.01);
(Continued)

(58) Field of Classification Search
CPC ......... H04N 21/4307; H04N 21/43615; H04N 21/43637; H04N 21/8547; H04N 21/435;
(Continued)

(56) References Cited

U.S. PATENT DOCUMENTS 5,388,992 A * 2/1995 Franklin ................. G06F 3/016
340/407.1
6,470,378 B1 * 10/2002 Tracton et al. ............... 709/203
(Continued)

FOREIGN PATENT DOCUMENTS

CN 1559066 A 12/2004
CN 1599925 A 3/2005
(Continued)

OTHER PUBLICATIONS

International Search Report and Written Opinion—PCT/US2012/070382—ISA/EPO—Apr. 18, 2013 (120313WO).

*Primary Examiner* — Steven B Theriault
(74) *Attorney, Agent, or Firm* — MG-IP Law, P.C.

(57) ABSTRACT

Methods, apparatuses, systems, and computer-readable media for using haptic technologies to provide enhanced media experiences are presented. According to one or more aspects of the disclosure, a computing device, such as a smart phone, tablet computer, or portable media player, may establish a connection with a local content receiver. Subsequently, the computing device may receive, from the local content receiver, a sensation data signal that specifies one or more haptic effects to be provided at a particular time relative to playback of a media content item received by the local content receiver. Thereafter, the computing device may provide the one or more haptic effects.

40 Claims, 9 Drawing Sheets

(51) Int. Cl.
| | |
|---|---|
| *H04N 21/235* | (2011.01) |
| *H04N 21/41* | (2011.01) |
| *H04N 21/422* | (2011.01) |
| *H04N 21/43* | (2011.01) |
| *H04N 21/435* | (2011.01) |
| *H04N 21/436* | (2011.01) |
| *H04N 21/4363* | (2011.01) |
| *H04N 21/8547* | (2011.01) |
| *G06F 3/0481* | (2013.01) |

(52) U.S. Cl.
CPC ......... *H04N 21/422* (2013.01); *H04N 21/435* (2013.01); *H04N 21/4307* (2013.01); *H04N 21/43615* (2013.01); *H04N 21/43637* (2013.01); *H04N 21/8547* (2013.01); *G06F 3/0481* (2013.01)

(58) Field of Classification Search
CPC ............. H04N 21/235; H04N 21/4131; H04N 21/422; G08B 6/00; G06F 3/0481–3/0489
USPC .......................................................... 715/702
See application file for complete search history.

(56) References Cited

U.S. PATENT DOCUMENTS

| | | | | |
|---|---|---|---|---|
| 6,563,430 B1* | 5/2003 | Kemink | ........... | H04N 21/42202 340/12.22 |
| 7,068,290 B2* | 6/2006 | Bennett | ............. | G06F 17/30241 345/169 |
| 7,739,705 B2* | 6/2010 | Lee | ........................ | H04H 60/31 725/10 |
| 7,911,328 B2* | 3/2011 | Luden | ..................... | G06F 3/016 310/37 |
| 7,991,194 B2* | 8/2011 | Kim | .................. | G06F 17/30241 348/135 |
| 8,190,095 B1* | 5/2012 | Feldstein | ................. | H04B 1/40 455/41.2 |
| 8,239,277 B2* | 8/2012 | Lee | ..................... | G06Q 10/06316 340/539.13 |
| 8,325,020 B2* | 12/2012 | Izadi | .................... | H04W 76/023 340/10.1 |
| 8,359,610 B2* | 1/2013 | Falcon | ................... | H04H 60/31 348/734 |
| 8,369,887 B2* | 2/2013 | Choe | ..................... | G06F 1/1626 340/407.1 |
| 8,489,112 B2* | 7/2013 | Roeding | ................ | G06Q 30/00 455/412.1 |
| 8,554,140 B2* | 10/2013 | Klemmensen | ... | H04N 21/43637 455/41.2 |
| 8,577,203 B2* | 11/2013 | Choi | .................... | H04N 21/235 386/239 |
| 8,594,338 B2* | 11/2013 | Sinivaara | ............... | A42B 3/042 345/7 |
| 8,616,975 B1* | 12/2013 | Saund | ................... | A63F 13/327 463/39 |
| 8,660,581 B2* | 2/2014 | Davis | .................... | H04W 4/023 367/118 |
| 8,710,966 B2* | 4/2014 | Hill | ........................ | G06F 3/016 340/10.4 |
| 8,798,534 B2* | 8/2014 | Rodriguez | ....... | H04N 21/44008 340/407.2 |
| 8,850,532 B2* | 9/2014 | Belz | ........................ | G06F 21/10 726/5 |
| 9,041,562 B2* | 5/2015 | Jain | ...................... | G06F 1/1626 341/20 |
| 9,264,151 B1* | 2/2016 | Emigh | ................ | G06Q 30/0211 |
| 9,285,452 B2* | 3/2016 | Tammi | .................. | G01S 3/8006 |
| 9,291,701 B2* | 3/2016 | Shabtay | ................ | G01S 5/0284 |
| 9,369,776 B2* | 6/2016 | Lanier | ................. | G06Q 20/102 |
| 9,400,985 B2* | 7/2016 | Dobyns | ............. | G06Q 30/0234 |
| 9,491,237 B1* | 11/2016 | Garg | ...................... | H04W 4/021 |
| 2002/0177471 A1* | 11/2002 | Kaaresoja | ................ | G08B 6/00 455/567 |
| 2003/0067440 A1* | 4/2003 | Rank | ............................ | 345/156 |
| 2003/0135860 A1 | 7/2003 | Dureau | | |
| 2005/0062841 A1* | 3/2005 | Rivera-Cintron | ........ | A63G 7/00 348/14.02 |
| 2005/0226601 A1* | 10/2005 | Cohen | .................... | H04N 7/165 386/263 |
| 2006/0066569 A1* | 3/2006 | Eid | ......................... | G06F 3/016 345/156 |
| 2007/0083895 A1* | 4/2007 | McCarthy | .......... | H04N 5/44543 725/46 |
| 2007/0236449 A1* | 10/2007 | Lacroix | .................... | G06F 3/016 345/156 |
| 2008/0096632 A1* | 4/2008 | Okada | ..................... | G07F 17/34 463/20 |
| 2008/0223627 A1* | 9/2008 | Lacroix | ................... | G06F 3/016 178/18.01 |
| 2008/0227393 A1* | 9/2008 | Tang | ...................... | H04W 8/005 455/41.3 |
| 2008/0297654 A1* | 12/2008 | Verberkt | ............... | G06T 1/0021 348/500 |
| 2009/0049092 A1* | 2/2009 | Capio et al. | ................ | 707/104.1 |
| 2009/0061841 A1* | 3/2009 | Chaudhri | ........... | H04M 1/72527 455/420 |
| 2009/0096573 A1* | 4/2009 | Graessley | ............. | H04W 12/04 340/5.8 |
| 2009/0096632 A1* | 4/2009 | Ullrich | .................. | H04N 9/8205 340/4.21 |
| 2009/0128306 A1 | 5/2009 | Luden et al. | | |
| 2009/0157753 A1* | 6/2009 | Lee | ................... | G06F 17/30053 |
| 2009/0189748 A1* | 7/2009 | Bergere | ................ | H04R 1/1091 340/407.1 |
| 2009/0270045 A1 | 10/2009 | Flaherty | | |
| 2010/0004033 A1* | 1/2010 | Choe | ..................... | G06F 1/1626 455/567 |
| 2010/0148942 A1 | 6/2010 | Oh et al. | | |
| 2010/0153995 A1* | 6/2010 | Belz | .......................... | H04N 5/50 725/39 |
| 2010/0185308 A1* | 7/2010 | Yoshida | ..................... | H04S 7/00 700/94 |
| 2010/0278512 A1 | 11/2010 | Ryu et al. | | |
| 2010/0280826 A1* | 11/2010 | Bakish | ..................... | G01H 9/00 704/226 |
| 2011/0029370 A1* | 2/2011 | Roeding | ................ | G06Q 30/00 705/14.38 |
| 2011/0054890 A1* | 3/2011 | Ketola | .................... | G10L 21/06 704/231 |
| 2011/0133910 A1* | 6/2011 | Alarcon | .................. | A61H 19/32 340/407.1 |
| 2011/0188832 A1* | 8/2011 | Choi | .................... | H04N 21/235 386/239 |
| 2011/0243524 A1* | 10/2011 | Cho | ...................... | H04N 9/8205 386/230 |
| 2011/0244963 A1* | 10/2011 | Grant | ...................... | G06F 3/011 463/37 |
| 2011/0248837 A1 | 10/2011 | Israr et al. | | |
| 2011/0264491 A1* | 10/2011 | Birnbaum | ............... | G06F 3/016 705/14.4 |
| 2011/0319130 A1* | 12/2011 | Lee | .................. | H04M 1/72572 455/556.1 |
| 2012/0050324 A1* | 3/2012 | Jeong | ..................... | G06F 17/30 345/633 |
| 2012/0070085 A1* | 3/2012 | Arn | .......................... | H04N 7/185 382/173 |
| 2012/0084467 A1* | 4/2012 | Birnbaum | ............... | G06F 3/016 710/16 |
| 2012/0128174 A1* | 5/2012 | Tammi | .................... | H04S 1/002 381/92 |
| 2012/0178431 A1* | 7/2012 | Gold | ..................... | H04M 1/7253 455/420 |
| 2012/0206247 A1* | 8/2012 | Bhatia | ..................... | G06F 3/016 340/407.1 |
| 2012/0214515 A1* | 8/2012 | Davis | .................... | H04W 4/023 455/456.3 |

(56) References Cited

U.S. PATENT DOCUMENTS

| | | | | |
|---|---|---|---|---|
| 2012/0221687 A1* | 8/2012 | Hunter | ............ | G06F 17/30029 709/219 |
| 2012/0290689 A1* | 11/2012 | Beguelin | ............... | H04L 67/125 709/220 |
| 2012/0306631 A1* | 12/2012 | Hughes | ............... | H04M 19/047 340/407.1 |
| 2012/0319825 A1* | 12/2012 | Shimy | ................. | H04L 12/2818 340/12.5 |
| 2013/0038792 A1* | 2/2013 | Quigley | ................ | A61H 19/00 348/515 |
| 2013/0086633 A1* | 4/2013 | Schultz | .................... | H04L 9/00 726/2 |
| 2013/0237156 A1* | 9/2013 | Jung | .................. | H04M 1/7253 455/41.2 |

FOREIGN PATENT DOCUMENTS

| | | | |
|---|---|---|---|
| CN | 101910978 | A | 12/2010 |
| CN | 102227694 | A | 10/2011 |
| EP | 2237577 | A1 | 10/2010 |
| JP | 2003324402 | A | 11/2003 |
| JP | 2005333365 | A | 12/2005 |
| JP | 2006135930 | A | 5/2006 |
| JP | 2007088801 | A | 4/2007 |
| JP | 2010246094 | A | 10/2010 |
| JP | 2011234261 | A | 11/2011 |
| WO | 03032289 | A1 | 4/2003 |
| WO | 2007015452 | A1 | 2/2007 |
| WO | 2009023856 | A1 | 2/2009 |
| WO | 2011009069 | A2 | 1/2011 |

* cited by examiner

ND MEDIA
USING HAPTIC TECHNOLOGIES TO PROVIDE ENHANCED MEDIA EXPERIENCES

CLAIM OF PRIORITY UNDER 35 U.S.C. § 119

This application claims priority to U.S. Provisional Application Ser. No. 61/578,685, filed Dec. 21, 2011, and entitled "Using Haptic Technologies to Provide Enhanced Media Experiences," which is incorporated by reference herein in its entirety for all purposes.

BACKGROUND

Aspects of the disclosure relate to computing technologies. In particular, aspects of the disclosure relate to mobile computing device technologies, such as systems, methods, apparatuses, and computer-readable media for providing enhanced media experiences.

Currently, when a person watches a movie, television show, or other media content, the person's television, computer, or other content receiver may reproduce two-dimensional and/or three-dimensional video content for viewing. However, current systems might provide only limited ways of incorporating haptic feedback into media playback, if they provide any support at all for haptic feedback. Aspects of the disclosure provide various techniques for using more sophisticated haptic technologies to further enhance media experiences.

SUMMARY

Systems, methods, apparatuses, and computer-readable media for using haptic technologies to provide enhanced media experiences are presented. According to one or more aspects, haptic feedback may be provided in combination with playback of media content (e.g., audio content, video content, audiovisual content, Internet content, video game content, etc.) via a device held in a user's hand during the playback, such as a smart phone or tablet computer.

As used herein, haptic feedback may include any kind of tactile and/or touch-based feedback, such as various texture sensations, pressure sensations, wetness sensations, adhesion sensations, thermal sensations, vibratory sensations, and/or any other effects that may be sensed by a person using his or her sense of touch. An electronic device, such a smart phone, personal digital assistant, tablet computer, and/or any other kind of mobile computing device, may provide such haptic feedback using one or more electronically actuated mechanical, electrical, and/or electromechanical components. In one example, for instance, piezoelectric transducers may be used to simulate pinching, protrusions, punctures, textures, and/or other tactile sensations. In one or more arrangements, the haptic feedback may be synchronized with features of the media content. In this manner, an enhanced user experience may be provided and a "fifth dimension" of content may be added to the user experience in the form of haptic feedback.

Advantageously, these and other features described herein may provide enhanced functionality, flexibility, and convenience to users of mobile devices.

According to one or more aspects of the disclosure, a computing device, such as a smart phone, tablet computer, or portable media player, may establish a connection with a local content receiver. Subsequently, the computing device may receive, from the local content receiver, a sensation data signal that specifies one or more haptic effects to be provided at a particular time relative to playback of a media content item received by the local content receiver. Thereafter, the computing device may provide the one or more haptic effects.

In at least one arrangement, establishing the connection with the local content receiver further may include detecting the local content receiver on a wireless area network, and sending registration information to the local content receiver. In at least one additional arrangement, the registration information may include device capability information. For example, the registration information may specify what types of haptic feedback the computing device is capable of reproducing, as this may depend on the particular combination of sensors and/or actuators included in and/or communicatively coupled to the computing device.

In at least one additional arrangement, before receiving the sensation data signal, the computing device first may detect a proximate content stream and may notify the local content receiver of the proximate content stream. In at least one additional arrangement, detecting the proximate content stream may include capturing audio corresponding to playback of the proximate content stream. Additionally or alternatively, notifying the local content receiver of the proximate stream may include sending at least a portion of the captured audio to the local content receiver. As discussed below, this may, for example, allow a user of the computing device to walk around in a location that has multiple media playback devices, such as a house that includes multiple televisions, while receiving haptic feedback synchronized with media content being provided by the media playback device that they are physically closest to and/or most likely to be watching.

In at least one additional arrangement, before providing the one or more haptic effects, the computing device may determine whether activity is detected. In some arrangements, determining whether activity is detected may include determining whether certain types of activity are detected that indicate whether the computing device is in motion or at rest. In other arrangements, determining whether activity is detected may include determining whether the computing device is being held by a user. In these ways, the computing device may avoid providing unnecessary haptic feedback if, for instance, the device is sitting on a table, not being held by a user, or otherwise positioned in a way in which the user might not feel the haptic effects that would otherwise be reproduced by the device.

In at least one additional arrangement, after providing haptic feedback associated with one media content item, the computing device subsequently may detect a new content stream associated with a second media content item. The computing device then may notify the local content receiver of the new content stream. Thereafter, the computing device may provide one or more additional haptic effects based on data received from the local content receiver. In at least one additional arrangement, before providing the one or more additional haptic effects, the computing device may wait for a predetermined amount of time. In these ways, the computing device may, for instance, adapt to situations where one program ends and another begins or where a user is changing channels/programs, while minimizing the amount of user input or other configuration needed to provided haptic feedback in connection with whichever program may be currently being played back.

BRIEF DESCRIPTION OF THE DRAWINGS

Aspects of the disclosure are illustrated by way of example. In the accompanying figures, like reference numbers indicate similar elements, and.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
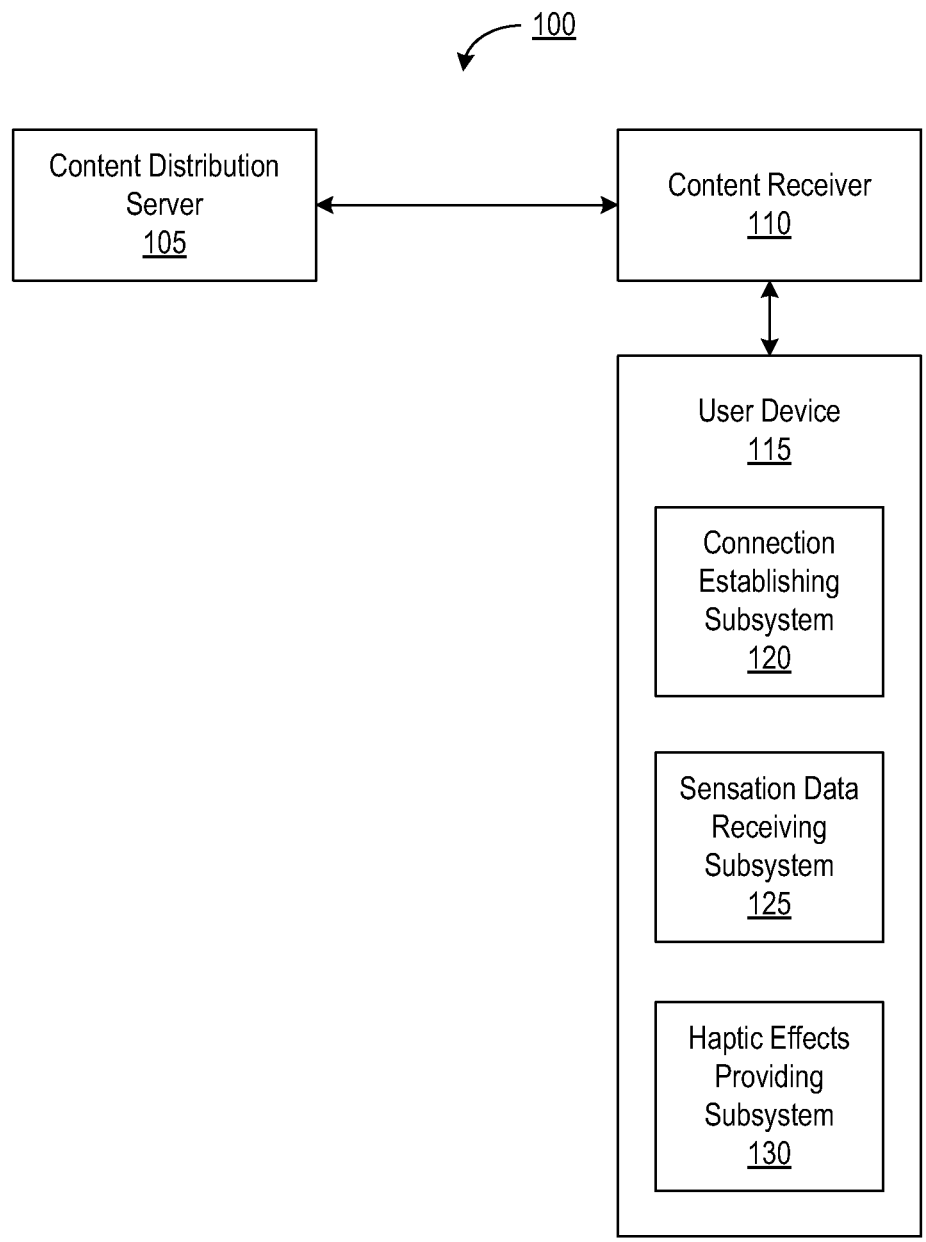
FIG. 1 illustrates an example system which may implement one or more illustrative aspects of the disclosure.

FIG. 1 illustrates an example system 100 which may implement one or more illustrative aspects of the disclosure. In one or more arrangements, system 100 may include one or more content distribution servers, such as content distribution server 105, one or more content receivers, such as content receiver 110, and one or more user devices, such as user device 115. In at least one arrangement, the content distribution server 105 may be located at a central office or head-end of a content distribution network. In some arrangements, the content distribution network may be a subscriber network, and the content distribution server 105 may, for example, be configured to communicate with the one or more content receivers, such as content receiver 110, via one or more satellite, fiber-optic, and/or coaxial connections.

In at least one embodiment, content receiver 110 may be located at a user location, such as a user's home or office. In addition, the content receiver 110 may be configured to receive signals transmitted by the content distribution server 105, and further may be configured to decode, display, play back, and/or otherwise provide media content and/or other content (e.g., haptic content) stored in the received signals.

In at least one arrangement, content receiver 110 may be configured to communicate with one or more user devices, such as user device 115. User device 115 may, for example, be a mobile device (e.g., a laptop computer, a smart phone, a tablet computer, a hand-held device, and/or any other type of computing device) located at the user location and/or otherwise located in the vicinity of the content receiver 110. In some arrangements, the user device 115 further may be communicatively coupled to a local area network (LAN) to which the content receiver 110 is also connected. In other arrangements, the user device 115 may be configured to establish a direct connection (e.g., a wireless data connection) with the content receiver 110. In addition, the user device 115 may include one or more haptic components which may be electronically actuated to provide haptic feedback to a user of the user device 115.

In some arrangements, the one or more haptic components included in the user device 115 may be the same type of component and/or may produce the same form of haptic feedback (e.g., texture sensations, wetness sensations, thermal sensations, etc.), while in other arrangements, the one or more haptic components included in the user device 115 may be different types of components and/or or may produce different forms of haptic feedback. Additionally or alternatively, the one or more haptic components included in user device 115 may operate individually and/or in combination to produce a plurality of different tactile effects. Although these haptic components are described as being "included in" the user device 115, it should be understood that these haptic components might not necessarily be inside of the user device 115. For example, it is contemplated that in some arrangements, one or more of these haptic components may be disposed along exterior surfaces of the user device 115. Additionally or alternatively, any and/or all of these haptic components may be incorporated into and/or provided as part of one or more peripheral accessories, which, for instance, may be communicatively coupled to the user device 115 (e.g., via one or more wireless and/or wired connections).

As seen in FIG. 1, user device 115 may include one or more subsystems that enable user device 115 to provide various features and functionalities discussed herein. For example, user device 115 may include a connection establishing subsystem 120, a sensation data receiving subsystem 125, and a haptic effects providing subsystem 130. One or more communication paths may be provided that enable the one or more subsystems to communicate and exchange data with each other. In addition, the various subsystems illustrated in FIG. 1 may be implemented in software, hardware, or combinations thereof. In at least one arrangement, each of the subsystems illustrated in FIG. 1 can be provided by one or more processors and/or memory units included in user device 115. A single processor included in user device 115 may, for example, provide all of these subsystems in some instances, while in other instances, each subsystem may be provided as and/or by a separate processor in user device 115. In some instances, user device 115 may include other subsystems than those shown in FIG. 1. Additionally, the embodiment shown in FIG. 1 is only one example of a system that may incorporate some embodiments. In other embodiments, system 100 and/or user device 115 may have more or fewer subsystems than those illustrated in FIG. 1, may combine two or more subsystems, or may have a different configuration or arrangement of subsystems.

In some embodiments, connection establishing subsystem 120 may enable user device 115 to establish a connection with a local content receiver. For example, connection establishing subsystem 120 may, in some instances, enable user device 115 to detect a local content receiver (e.g., content receiver 110) on a wireless area network and send registration information to the local content receiver (e.g., thereby registering user device 115 with the content receiver).

In some embodiments, sensation data receiving subsystem 125 may enable user device 115 to receive a sensation data signal from a local content receiver (e.g., content receiver 110). For example, sensation data receiving subsystem 125 may enable user device 115 to receive a sensation data signal from a content receiver with respect to which a connection was established using connection establishing subsystem 120. In some instances, a sensation data signal may, for example, specify one or more haptic effects to be provided at a particular time relative to playback of a media content item that is received by the local content receiver.

In some embodiments, haptic effects providing subsystem 130 may enable user device 115 to provide one or more haptic effects. For example, haptic effects providing subsystem 130 may enable user device 115 to provide the one or more haptic effects specified in the sensation data signal received by sensation data receiving subsystem 125. In some instances, haptic effects providing subsystem 130 may cause haptic feedback to be provided (e.g., to a user of user device 115) by actuating and/or otherwise controlling one or more haptic components included in user device 115.

While the embodiment shown in FIG. 1 and the examples discussed above illustrate various subsystems as being included in user device 115, in some additional and/or alternative embodiments, any and/or all of these subsystems may be incorporated into and/or otherwise provided by one or more other devices and/or components, such as one or more peripheral devices communicatively coupled to user device 115. Additionally or alternatively, such peripheral devices may include various hardware and/or software to implement any and/or all of these subsystems.

By implementing the example system 100 (or a similar system), an enhanced media experience may be provided to a user of the content receiver 110 and the user device 115. For example, such a user may be able to view media content received and/or displayed by the content receiver 110, such as a television show or movie, and the user may simultaneously be able to experience haptic feedback provided by the user device 115, where such haptic feedback may be synchronized with various aspects of the media content being received and/or displayed by the content receiver 110, such as the television show or the movie. An example method of how the devices of system 100 may operate to provide such a user experience will now be described with respect to FIG. 2.

Figure 2:
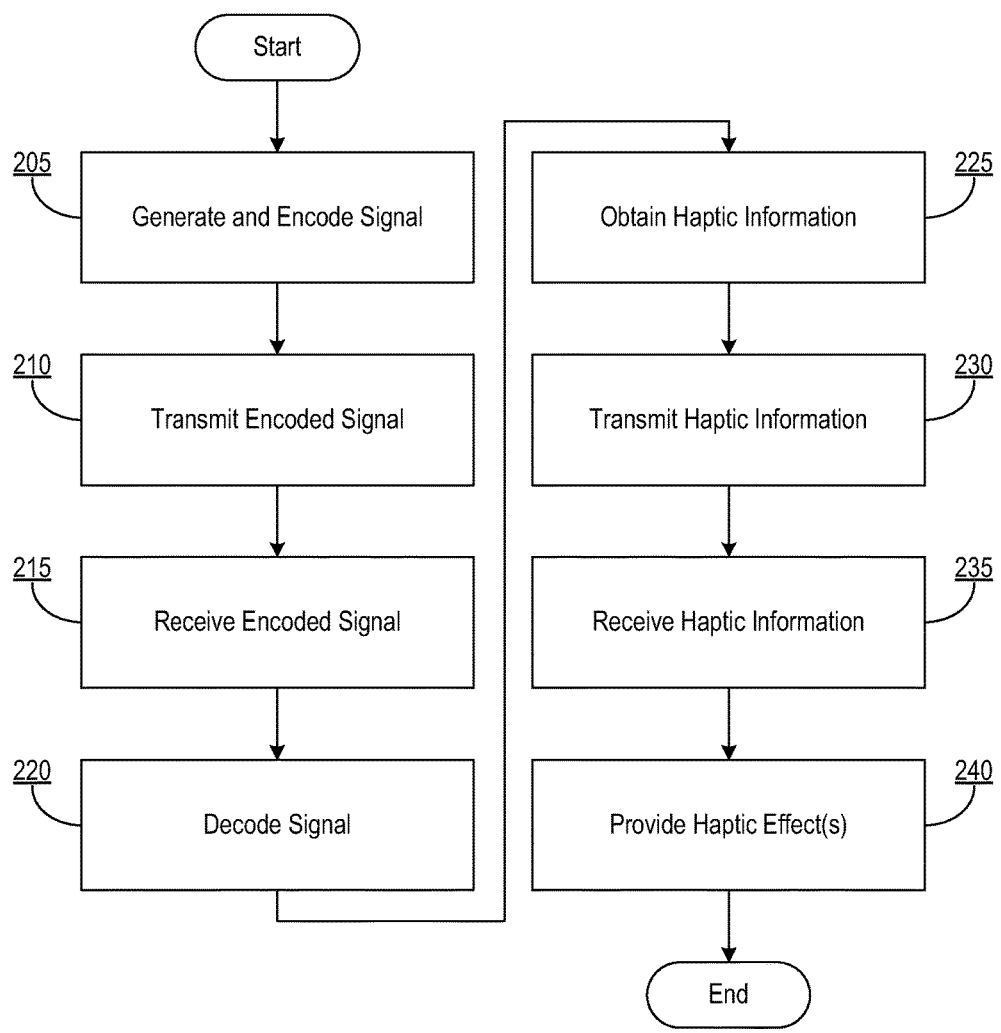
FIG. 2 illustrates an example method of providing enhanced media experiences according to one or more illustrative aspects of the disclosure.

In particular, FIG. 2 illustrates an example method of providing enhanced media experiences according to one or more illustrative aspects of the disclosure. In step 205, content distribution server 105 may generate and encode a signal. The signal may include media content (e.g., audio data, video data, etc.) and haptic data (e.g., information defining one or more haptic sensations to be provided in connection with the media content). In one or more arrangements, the haptic sensations defined by the haptic data may be synchronized with features of the media content. For example, an explosion that occurs in a movie may be synchronized with haptic feedback that includes providing sharp vibrations to a user who may be viewing the movie, an increase in device temperature, and/or other haptic effects. In at least one arrangement, the signal may be an audio signal (e.g., an audio signal associated the media content), and the haptic data may be encoded onto the audio signal (e.g., the haptic data may be encoded onto a particular channel of the audio signal) using one or more signal modulation techniques.

Subsequently, in step 210, the content distribution server 105 may transmit the encoded signal to one or more content receivers, including content receiver 110, via a content distribution network, for example. In step 215, the content receiver 110 may receive the encoded signal from the content distribution server, and in step 220, the content receiver 110 may decode the received signal.

In step 225, the content receiver 110 may obtain haptic information from the decoded signal. For example, in step 225, the content receiver 110 may extract haptic data defining one or more haptic sensations to be provided to a viewer and/or listener of the media content that is included in the signal. In at least one arrangement, the haptic data may include one or more markers, and each of the one or more markers may define one or more particular haptic sensations to be provided concurrently with and/or otherwise in combination with particular features, events, and/or other occurrences included in the media content. For example, one marker may specify that particular vibratory effects and/or thermal effects are to be provided concurrently with an explosion that occurs in a movie, while another marker may specify that particular pressure effects and/or wetness effects are to be provided concurrently with an underwater scene that occurs in the movie.

Subsequently, in step 230, the content receiver 110 may transmit the haptic information obtained from the signal to one or more user devices, such as user device 115. For example, content receiver 110 may transmit the haptic data to user device 115 via a local area network (LAN) connection, a direct connection (e.g., a Bluetooth connection), and/or any other wired and/or wireless data connection.

In step 235, user device 115 may receive the haptic information from content receiver 110. Subsequently, in step 240, user device 115 may provide one or more haptic effects based on the received haptic information. For example, in step 240, user device 115 may actuate one or more haptic components included in and/or otherwise communicatively coupled to user device 115 in order to provide the user of the user device 115 with the one or more haptic sensations defined by the haptic information received from the content receiver 110. In this manner, user device 115 may provide haptic feedback to the user that may be synchronized with media content that is simultaneously being viewed and/or otherwise experienced by the user.

In addition to transmitting haptic information obtained from a signal received from a content distribution server to one or more user devices, a content receiver may, in some instances, dynamically generate haptic data based on the audio data and/or video data received from the content distribution server, and subsequently transmit such dynamically generated haptic data to the one or more user devices. In dynamically generating such haptic data, a content receiver may, for instance, analyze the audio data and/or video data received from the content distribution server and select one or more predefined haptic feedback effects that match one or more determined properties of the audio data and/or video data. For example, a content receiver may analyze particular audio data and video data, and after identifying a loud spike in sound volume and video frames that include images of an explosion, may select predefined vibratory and/or thermal haptic feedback effects (e.g., that are predefined as corresponding to an explosion) to be transmitted to the one or more user devices. In other instances, other predefined haptic feedback effects, such as non-vibratory haptic feedback effects, may additionally and/or alternatively be selected by a content receiver based on analyzed audio data and/or analyzed video data.

Figure 3:
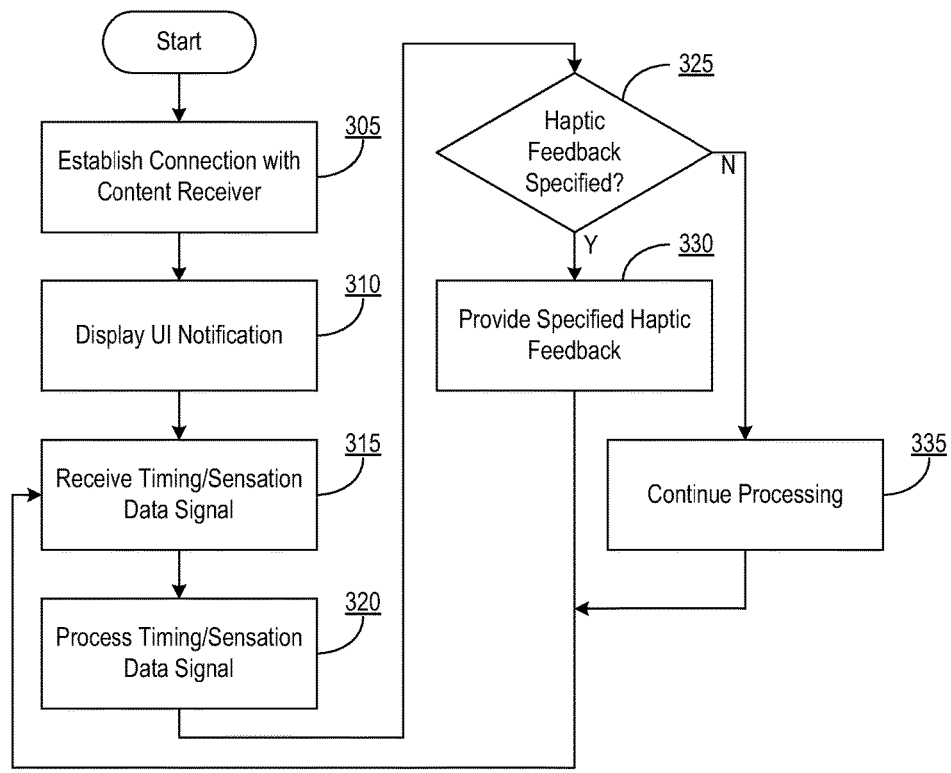
FIG. 3 illustrates an example method of receiving and processing a sensation data signal according to one or more illustrative aspects of the disclosure.

FIG. 3 illustrates an example method of receiving and processing a sensation data signal according to one or more illustrative aspects of the disclosure. According to one or more aspects of the disclosure, the example method illustrated in FIG. 3 may be performed by a computing device, such as user device 115, in order to provide haptic feedback to a user, where the haptic feedback is synchronized with media content being viewed and/or played by the user (e.g., on another device, such as content receiver 110). In some instances, the computing device performing the example method of FIG. 3 may be a mobile device used in the user's home, for instance, while watching television or other media content on a home theater system. In other instances, the computing device performing the example method of FIG. 3 may be a mobile device used in a movie theater, for instance, while watching a movie or other media content at the movie theater. Additionally or alternatively, while a specialized device may be used, deployed, and/or otherwise provided for use in either the home theater or the movie theater setting, it is contemplated that in some instances, a user's typical mobile device (e.g., the user's cell phone, smart phone, tablet computer, etc.) may be configured to execute the example method of FIG. 3 and/or otherwise provide similar functionalities to those described herein (e.g., by storing and/or executing computer-readable instructions embodying one or more aspects of the disclosure).

In step 305, a connection may be established with a content receiver. For example, in step 305, a computing device (e.g., user device 115) may establish a data connection with a content receiver computer. In some instances, the content receiver computer may be part of a home entertainment system, such as a set-top box, television, home computer, and so on. In other instances, the content receiver computer may be part of a commercial entertainment system, such as a commercial projection system (e.g., a digital projector) that might be located at and/or operated by a movie theater.

In step 310, a user interface notification may be displayed. For example, in step 310, having established a connection to the content receiver, the computing device may display a user interface notification to notify the user that the connection has been established and/or that haptic feedback may be provided via the connection, such as haptic feedback that is synchronized with media content being decoded, displayed, played, and/or otherwise being provided to the user (e.g., via the content receiver and/or one or more additional associated systems).

In step 315, a timing/sensation data signal may be received. For example, in step 315, the computing device may receive a data signal from the content receiver that includes timing and/or sensation information associated with media content currently being decoded, displayed, played, and/or otherwise being provided by the content receiver. In one or more arrangements, the timing/sensation data signal may include information specifying that one or more haptic sensations are to be provided at one or more particular times. Additionally or alternatively, the one or more particular times at which haptic feedback is to be provided may be specified with respect to the elapsed time of the media content. In at least one arrangement, the timing/sensation data signal may embody one or more aspects of the example sensation timeline illustrated in FIG. 4 and described in greater detail with respect thereto below.

Referring again to FIG. 3, in step 320, the received timing/sensation data signal may be processed. For example, in step 320, the computing device may process the received data signal to extract (e.g., as discrete data structures) the timing information and/or the sensation information from the data packets that may form the data signal.

In step 325, it may be determined whether any haptic feedback is specified. For example, in step 325, the computing device may determine whether the timing/sensation data signal specifies any haptic feedback to be provided (e.g., at a current time and/or at an upcoming time). In at least one arrangement, the computing device may determine that the timing/sensation data signal specifies that haptic feedback is to be provided if a sensation marker (e.g., a data structure, as described below) included in the data signal specifies that certain haptic feedback is to be provided at a particular time, such as a current and/or upcoming time.

If it is determined, in step 325, that haptic feedback is specified, then in step 330, the specified haptic feedback may be provided. For example, in step 330, the computing device may activate, actuate and/or otherwise control one or more electronically actuated components that may be included in, coupled to, and/or controlled by the computing device to provide the specified haptic feedback to the user. For instance, the computing device may include, be coupled to, and/or control one or more haptic components that are configured to provide any kind of tactile and/or touch-based feedback, such as various texture sensations, pressure sensations, wetness sensations, adhesion sensations, thermal sensations, vibratory sensations, and/or any other effects that may be sensed by a person using his or her sense of touch, and the data signal may specify haptic sensations that involve actuating any and/or all of these components.

On the other hand, if it is determined, in step 325, that haptic feedback is not specified, then in step 335, processing may continue, and the computing device, for example, may return to execution of step 315, in which the timing/sensation data signal may continue to be received (and subsequently processed, e.g., as described above). Thereafter, steps 315 to 335 of the example method may continue in a loop until the movie or other program ends, until the user requests to stop execution, and/or until execution of the loop is otherwise broken.

Having described an example method of receiving and processing a sensation data signal with respect to FIG. 3, the signal itself will now be described in greater detail with respect to FIG. 4.

Figure 4:
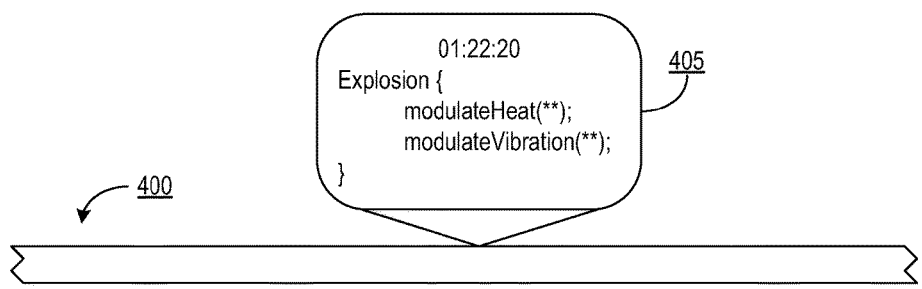
FIG. 4 illustrates an example of a sensation timeline according to one or more illustrative aspects of the disclosure.

In particular, FIG. 4 illustrates an example of a sensation timeline that includes a sensation marker according to one or more illustrative aspects of the disclosure. According to one or more aspects, sensation timeline 400 may represent the timing/sensation data signal described above. In addition, sensation timeline 400 may include one or more sensation markers, such as sensation marker 405, which may specify one or more haptic sensations to be provided as haptic feedback to a user at one or more particular times (e.g., one or more particular times associated with a particular media content item, such as a movie or television show).

In the example illustrated in FIG. 4, for instance, sensation marker 405 may correspond to an explosion sensation that is to be provided after one hour, twenty-two minutes, and twenty seconds of a media content item (e.g., the media content item to which sensation timeline 400 corresponds) have elapsed. The explosion sensation may be defined (e.g., in a data structure represented by sensation marker 405) to include thermal effects and vibration effects, and may include one or more functions, values, and/or other variables that specify how the thermal effects and vibration effects associated with the explosion sensation are to be provided to the user (e.g., the user who is watching the media content item). Additionally or alternatively, the sensation timeline 400 and/or sensation marker 405 may be configured such that the explosion sensation is synchronized with and/or otherwise corresponds to an explosion in the media content (e.g., in the video and/or audio data corresponding to the media content). As described above, the user's computing device (e.g., user device 115) may be configured to receive the data signal corresponding to sensation timeline 400 and provide the haptic feedback specified by sensation marker 405 at the specified time during playback of the media content item. In this manner, haptic feedback may be provided to a user of a mobile device (e.g., user device 115), where the haptic feedback is synchronized with the playback of media content.

Having described a number of examples of how a sensation data signal may be received and processed, several examples illustrating how a user device may initially register with a content receiver, discover a local content stream that has corresponding sensation data, and provide haptic feedback based on detecting certain kinds of device activity will now be discussed in greater detail.

Figure 5:
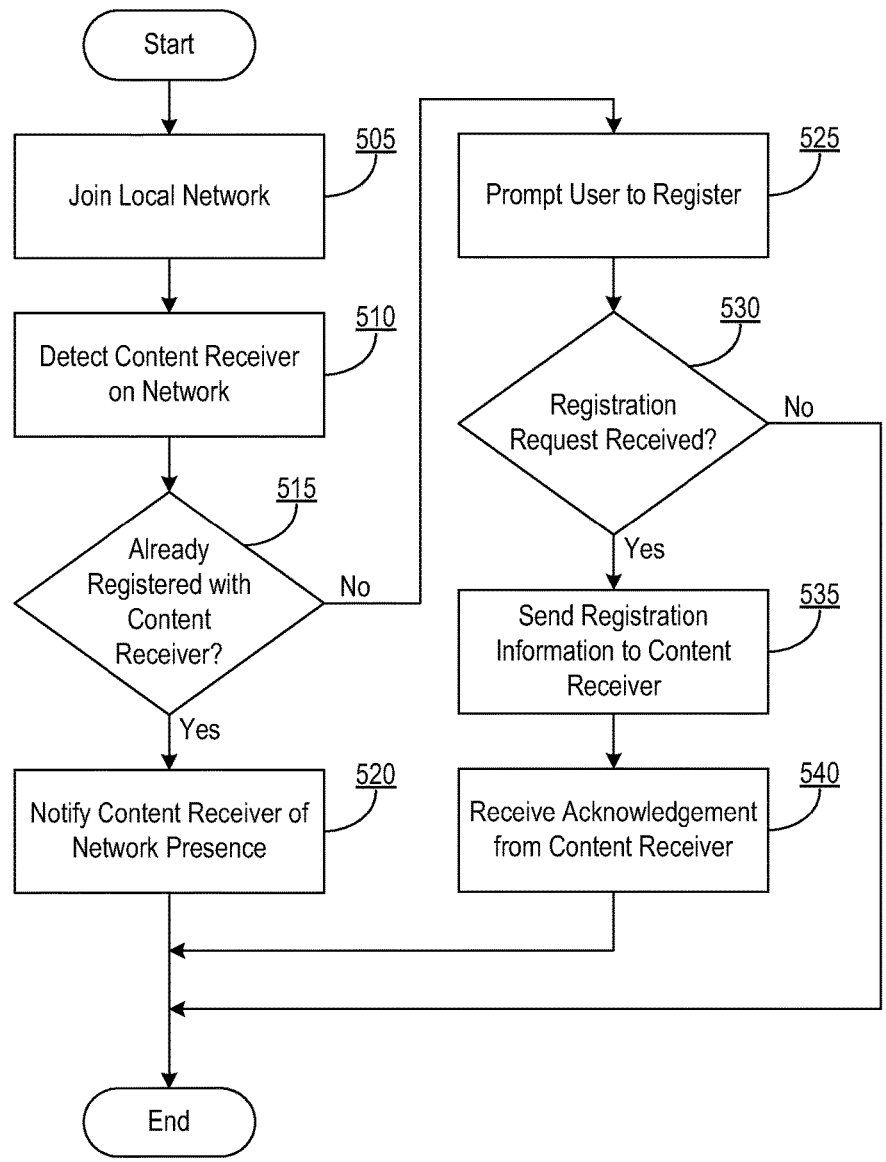
FIG. 5 illustrates an example method of registering with a content receiver according to one or more illustrative aspects of the disclosure.

FIG. 5 illustrates an example method of registering with a content receiver according to one or more illustrative aspects of the disclosure. According to one or more aspects of the disclosure, the example method illustrated in FIG. 5 may be performed by a computing device, such as user device 115, in order to initially establish a connection with a content receiver (e.g., content receiver 110) and exchange registration information with the content receiver. This registration may, for example, allow for the user device 115 to inform the content receiver 110 that it is online and available to provide haptic feedback, and further may allow the user device 115 to inform the content receiver 110 of the particular type or types of haptic feedback which the user device 115 is capable of providing. The user device 115 thus may perform the registration method illustrated in FIG. 5 before a sensation data signal is received from the content receiver 110 and/or before haptic feedback is provided, as the content receiver 110 might be configured to send the sensation data signal to the user device 115 only after the user device 115 has registered with the content receiver 110. Other configurations which may involve other registration steps instead of and/or in addition to those illustrated in the example method of FIG. 5 can also be used.

In step 505, the user device 115 may join a local network. In one or more arrangements, the local network may be a network to which one or more content receivers, such as content receiver 110, are also connected. The local network may include one or more wired connections (e.g., one or more Ethernet connections), one or more wireless connections (e.g., one or more IEEE 802.11 connections, one or more Bluetooth connections, etc.), and/or combinations thereof. In at least one arrangement, joining a local network may include joining a network provided by a content receiver. For example, content receiver 110 may be configured to operate as a wireless access point and may provide a wireless local area network, and user device 115 may connect to the wireless local area network provided by the content receiver 110.

In step 510, the user device 115 may detect the content receiver 110 on the local network. For example, in step 510, the user device 115 may interrogate one or more other devices connected to the network and subsequently may determine that the content receiver 110 (and/or one or more other content receivers) is connected to the same local network.

In step 515, the user device may determine whether it has already registered with the detected content receiver. For example, in step 515, the user device 115 may determine, based on registration history information stored by user device 115, for instance, whether the user device 115 has previously registered with content receiver 110.

If the user device determines, in step 515, that it has already registered with the detected content receiver, then in step 520, the user device may notify the content receiver of its network presence. For example, if user device 115 determines that it has previously registered with content receiver 110, then in step 520, the user device 115 may notify content receiver 110 that the user device 115 is connected to the network. In one or more arrangements, notifying the content receiver of the network presence of the user device may include sending, by the user device, one or more messages to the content receiver that include information identifying the user device (e.g., device make, device model, a unique device identifier, etc.) and/or networking information associated with the user device (e.g., a local network address, such as an IP address, assigned to the user device by one or more routing devices on the local network).

In addition to sending, to a content receiver, information identifying the user device and/or networking information associated with the user device, the user device additionally may send other information to a detected content receiver. For example, in some arrangements, the user device may send information specifying one or more settings and/or other preferences set by a user of the user device. Such settings may relate to haptic feedback, and may, for instance, specify certain haptic effects that are and/or are not to be provided to a user of the user device. Additionally or alternatively, such settings may include one or more user identities and/or other user profile information, which may specify certain settings related to haptic feedback as being different for different users of the user device. This may, for example, enable parental controls to be provided with respect to haptic feedback on the user device. For example, the user device may be configured to provide all available haptic feedback effects to one or more adult users, but the user device may be configured to provide only selected haptic feedback effects to one or more child users, as may be defined in the user profile information.

In one or more additional and/or alternative arrangements, notifying the content receiver of the network presence of the user device may include displaying a notification (e.g., to inform the user of the user device that the content receiver has been notified of the network presence of the user device) based on receiving an acknowledgement message from the content receiver. An example of a user interface that includes such a notification is illustrated in FIG. 6.

Figure 6:
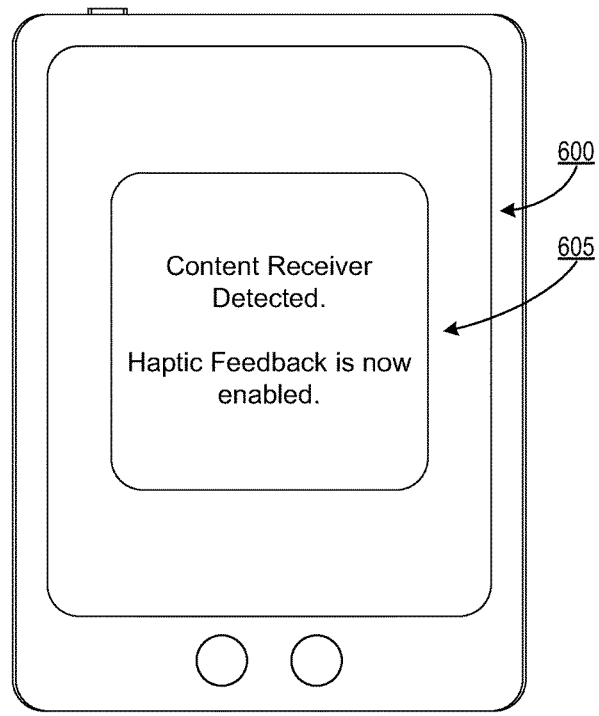
FIGS. 6 and 7 illustrate example user interfaces that may be displayed in registering with a content receiver according to one or more illustrative aspects of the disclosure.

In particular, FIG. 6 illustrates an example user interface 600 that includes a notification 605. In one or more arrangements, the example user interface 600 may be displayed by a user device, such as user device 115, on a touch-sensitive display screen included in and/or otherwise communicatively coupled to the user device 115.

As seen in FIG. 6, notification 605 of user interface 600 may be configured to inform a user of the user device (e.g., user device 115) that a content receiver has been detected and/or that haptic feedback has been enabled (e.g., based on one or more signals received from the content receiver). Additionally or alternatively, notification 605 may be further configured to inform the user that the user device has notified the content receiver of the user's device's network presence.

Referring back to FIG. 5, if the user device determines, in step 515, that it has not already registered with the detected content receiver, then in step 525, the user device may prompt a user of the user device to register with the detected content receiver. In one or more arrangements, prompting the user of the user device to register with the detected content receiver may include displaying, by the user device, a menu, dialog box, or other prompt that asks the user to make a selection indicating whether he or she would like to register the user device with the detected content receiver, for instance, so as to enable the user device to provide haptic feedback based on content received, decoded, and/or otherwise caused to be played back by the content receiver. An example of a user interface that includes such a prompt is illustrated in FIG. 7.

Figure 7:
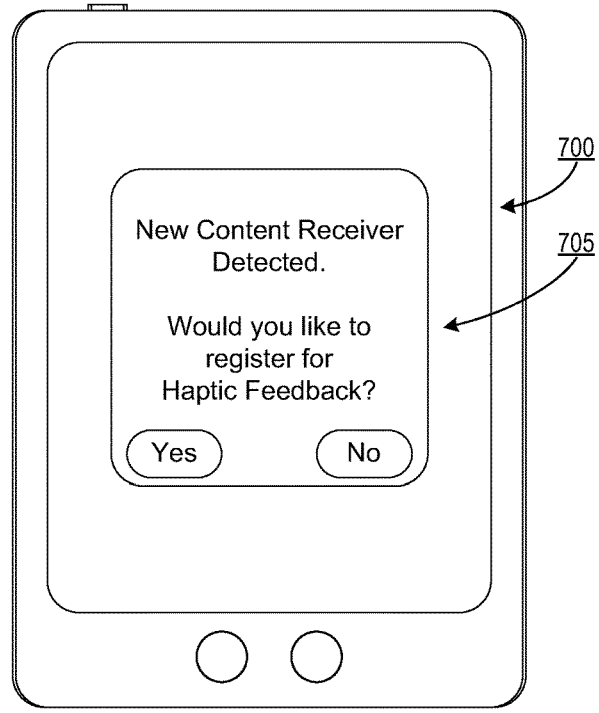

In particular, FIG. 7 illustrates an example user interface 700 that includes a notification 705. In one or more arrangements, the example user interface 700 may be displayed by a user device, such as user device 115, on a touch-sensitive display screen included in and/or otherwise communicatively coupled to the user device 115.

As seen in FIG. 7, notification 705 of user interface 700 may be configured to ask a user of the user device (e.g., user device 115) to make a selection indicating whether he or she would like to register the user device with the detected content receiver, for instance, so as to enable the user device to provide haptic feedback. Additionally or alternatively, notification 705 may be further configured to inform the user of additional details about the detected content receiver, as this may allow the user to decide whether they wish to register with the content receiver.

Referring back to FIG. 5, in step 530, the user device may determine whether a registration request has been received. In one or more arrangements, determining whether a registration request has been received may be based on user input received by the user device, such as a selection received by the user device in response to the prompt displayed in step 525.

If the user device determines, in step 530, that a registration request has been received, then in step 535, the user device may send registration information to the detected content receiver. In one or more arrangements, sending registration information to the content receiver may include sending, by the user device, one or more messages and/or other electronic communications that include information about the user device, such as information identifying the user device (e.g., information identifying the manufacturer and/or model of the user device) and/or information describing the capabilities of the user device.

For example, in sending registration information to the content receiver 110, the user device 115 may send, via the local network, one or more messages to the content receiver 110 that include information identifying the user device 115 and/or information describing the capabilities of the user device 115. The information identifying the user device 115 may include the name of the manufacturer of the user device 115, the model name of the user device 115, the model number of the user device 115, the version number(s) of hardware and/or software included in and/or being executed on the user device 115, and/or other information. Additionally or alternatively, the information describing the capabilities of the user device 115 may include device capability information identifying one or more haptic input sensors included in the user device 115 and/or one or more haptic output components included in the user device 115.

For example, for each of the one or more haptic input sensors included in the user device 115, the device capability information may include the type or types of haptic input that the particular sensor is capable of capturing (e.g., protrusion and/or deformation haptic input, thermal haptic input, vibratory haptic input, textural haptic input, etc.), the position of the particular sensor (e.g., coordinates specifying the position of the particular sensor with reference to one or more reference points on one or more surfaces of the user device 115 and/or with reference to one or more other sensors included in the user device 115), and/or other information identifying the particular sensor (e.g., the manufacturer of the sensor, the model name and/or model number of the sensor, the version number of the sensor, etc.). Additionally or alternatively, for each of the one or more haptic output components included in the user device 115, the device capability information may include the type or types of haptic output that the particular component is capable of reproducing (e.g., protrusion and/or deformation haptic effects, thermal haptic effects, vibratory haptic effects, textural haptic effects, etc.), the position of the particular component (e.g., coordinates specifying the position of the particular component with reference to one or more reference points on one or more surfaces of the user device 115 and/or with reference to one or more other components included in the user device 115), and/or other information identifying the particular component (e.g., the manufacturer of the component, the model name and/or model number of the component, the version number of the component, etc.).

In some instances, the information identifying a particular sensor and/or identifying a particular component included in the user device 115 may allow the content receiver 110 to look up and/or otherwise determine the capabilities of the particular sensor and/or the particular component, as the content receiver 110 may be configured to look up (e.g., using an Internet connection) and/or use capability information for the particular sensor and/or the particular component in cases where such information is not provided by the user device 115 during registration. Additionally or alternatively, the content receiver 110 may be configured to look up (e.g., using an Internet connection) and/or verify capability information for the particular sensor and/or the particular component even in cases where such information is provided by the user device 115 during registration.

Referring again to FIG. 5, in step 540, the user device may receive an acknowledgement message from the content receiver. In one or more arrangements, receiving an acknowledgment message from the content receiver may include receiving information from the content receiver confirming that the registration information provided to the content receiver in step 535 was received and/or that one or more timing/sensation data signals will be provided to the user device in connection with one or more content items. Additionally or alternatively, receiving an acknowledgement message from the content receiver may include initially receiving, at the user device, one or more timing/sensation data signals from the content receiver. For example, in some arrangements, the user device 115 may begin receiving one or more timing/sensation data signals from the content receiver 110 in step 540.

Once a user device has registered with a content receiver, the user device may be able to provide haptic feedback to one or more users, where the haptic feedback is synchronized with media content received, decoded, displayed, and/or otherwise played by the content receiver. In some situations, a user device might only need to register with the content receiver on a single occasion, such that on future occasions when the user device is near the content receiver (or otherwise in a position in which it would be desirable to provide haptic feedback), the user device may simply notify the content receiver and start receiving haptic data from the content receiver so as to begin providing haptic feedback to the user. Several examples will now be described that illustrate how a user device can determine that it is near a content receiver or otherwise located in a place in which haptic feedback may be provided in connection with particular media content.

Figure 8:
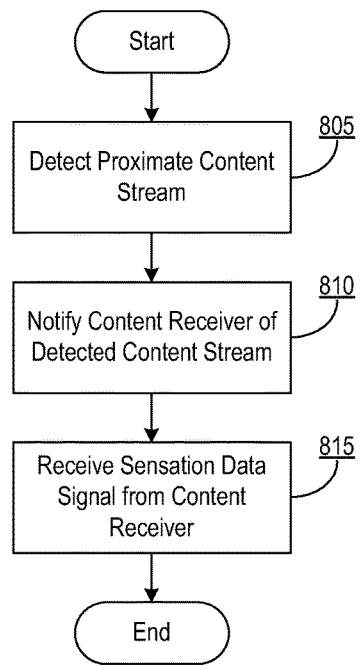
FIG. 8 illustrates an example method of discovering a local content stream that has corresponding sensation data according to one or more illustrative aspects of the disclosure.

FIG. 8 illustrates an example method of discovering a local content stream that has corresponding sensation data according to one or more illustrative aspects of the disclosure. According to one or more aspects, the example method illustrated in FIG. 8 may be performed by a computing device, such as user device 115, in order to identify a particular content stream in the vicinity of the computing device and notify a content receiver that the particular content stream has been identified. As discussed below, this may enable the content receiver to provide the device with a sensation data signal that is synchronized with the particular content stream.

In step 805, a user device, such as user device 115, may detect a proximate content stream. In some embodiments, a device may detect a proximate content stream by determining, based on data captured by one or more sensors, that a particular content stream is being played back within the vicinity of the device. This data may include audio data captured by one or more microphones included in the device, image and/or video data captured by one or more cameras included in the device, and/or other data.

For example, in step 805, user device 115 may capture audio and/or video data (e.g., using one or more microphones and/or cameras) from the device's local surroundings. By analyzing the captured audio and/or video data, user device 115 then may determine that a particular content stream (e.g., of one or more content streams received and/or decoded by a local content receiver at a premises at which user device 115 is located) is a proximate content stream in relation to the current position of user device 115. For instance, user device 115 may determine that it is physically close to a particular display screen and/or sound system that is playing back a particular content stream based on determining that audio data and/or video data captured by user device 115 includes and/or otherwise corresponds to audio data and/or video data that is part of and/or otherwise associated with the particular content stream.

Subsequently, in step 810, the user device may notify a content receiver that it has detected the content stream. In some embodiments, a device may notify a content receiver in this manner by sending the content receiver one or more messages (e.g., via a wireless data connection) that include information identifying the detected content stream, such as a title of a currently playing program, a unique identifier associated with the content stream, and/or other information. Additionally or alternatively, the device may notify a content receiver by sending samples of captured audio and/or video data to the content receiver, thereby enabling the content receiver to analyze the captured audio and/or video data so as to recognize the detected content stream. For example, in step 810, user device 115 may send a local content receiver one or more messages notifying the content receiver that user device 115 has detected and is proximate to the content stream detected in step 805. This notification may enable and/or cause the local content receiver to provide a sensation data signal corresponding to the detected content stream to user device 115.

In step 815, the user device may receive a sensation data signal from the local content receiver. As indicated above, in various embodiments, the sensation data signal received by the user device from the local content receiver may correspond to the proximate content stream detected by the user device. More specifically, this sensation data signal may include information defining one or more haptic sensations to be provided to a user of the user device (e.g., user device 115) as haptic feedback. Further, the sensation data signal may be configured to cause the user device to provide these haptic sensations at particular times, such that the haptic sensations provided by the user device are provided synchronously with particular events in the content stream. Examples of events with respect to which haptic feedback may be provided include explosions, lightning strikes, earthquakes, rain, footsteps, and so on. While these events are listed here as examples, haptic feedback may be provided in connection with any other events, as desired, instead of and/or in addition to those events listed here.

By performing the example method discussed above with respect to FIG. 8, a user device may be able to identify a particular content stream as being proximate to the device, and notify a content receiver in order to receive a sensation data signal associated with the content stream. This may enable a user device to automatically synchronize itself with a particular content stream and corresponding sensation data signal, even in an environment where multiple local media devices are playing back a number of different content streams at the same time. An example of such an environment is illustrated in FIG. 9.

Figure 9:
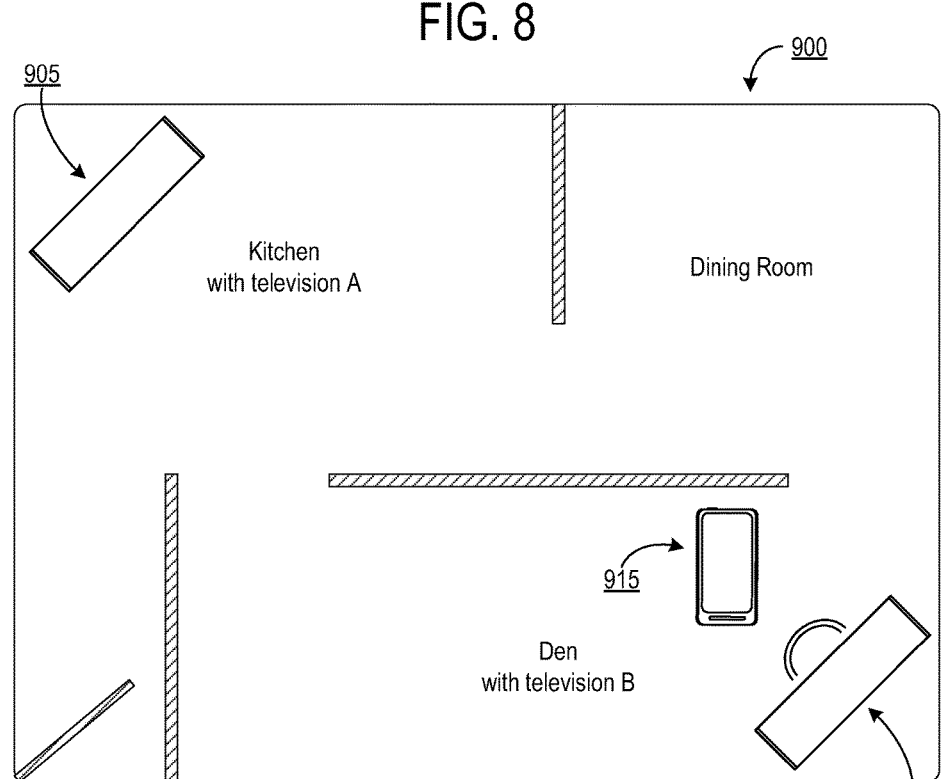
FIG. 9 illustrates an example of a device discovering a local content stream that has corresponding sensation data according to one or more illustrative aspects of the disclosure.

FIG. 9 illustrates an example of a device discovering a local content stream that has corresponding sensation data according to one or more illustrative aspects of the disclosure. As seen in FIG. 9, a local environment 900, which may represent a house, apartment, or other premises, may include a number of media playback devices, such as television 905 and television 910. In addition, various media playback devices may be located in different rooms or other distinct areas of the local environment 900. For instance, in the example illustrated in FIG. 9, television 905 may be located in a kitchen area of local environment 900, while television 910 may be located in a den area of local environment 900.

As also illustrated in FIG. 9, a user device, such as user device 915, may be a mobile device that a user may carry between different areas of local environment 900. As user device 915 is moved through different areas of local environment 900, user device 915 may be proximate to different media devices, and correspondingly, different content streams being played back by the different media devices.

By performing one or more steps of the method discussed above with respect to FIG. 8, user device 915 of FIG. 9 may be able to identify a particular content stream as being a proximate content stream, so as to receive a sensation data signal and provide haptic feedback that corresponds to a content stream that is most likely being viewed, listened to, and/or otherwise experienced by a user of the user device 915. For instance, by capturing audio data and/or video data from its local surroundings, user device 915 may determine that it is near a first content stream being played back by television 910, e.g., rather than a second content stream being played back by television 905.

In addition to using captured audio and/or captured video to detect a proximate content stream (e.g., as in some of the examples discussed above with respect to FIG. 8), a user device, such as user device 115, additionally or alternatively may detect a proximate content stream using location services provided by and/or otherwise available to the user device. For example, in some arrangements, the user device 115 may use indoor and/or outdoor navigation technologies (e.g., WiFi scanning, satellite positioning, etc.) in order to determine its position and subsequently detect a proximate content stream. In some additional and/or alternative arrangements, a content receiver and/or a media playback device may transmit a local wireless signal that may be used by a user device as a position reference in device discovery and/or content stream detection.

In some embodiments, once a user device determines that it is proximate to a particular content stream and begins receiving a sensation data signal associated with the content stream, the user device then may determine whether it is in an appropriate position to provide haptic feedback to one or more users of the user device. For user devices that are designed to be held in a user's hand or hands, determining whether the device is in an appropriate position to provide haptic feedback may include determining whether the device is currently being held by the user, for instance, as discussed in greater detail below.

Figure 10:
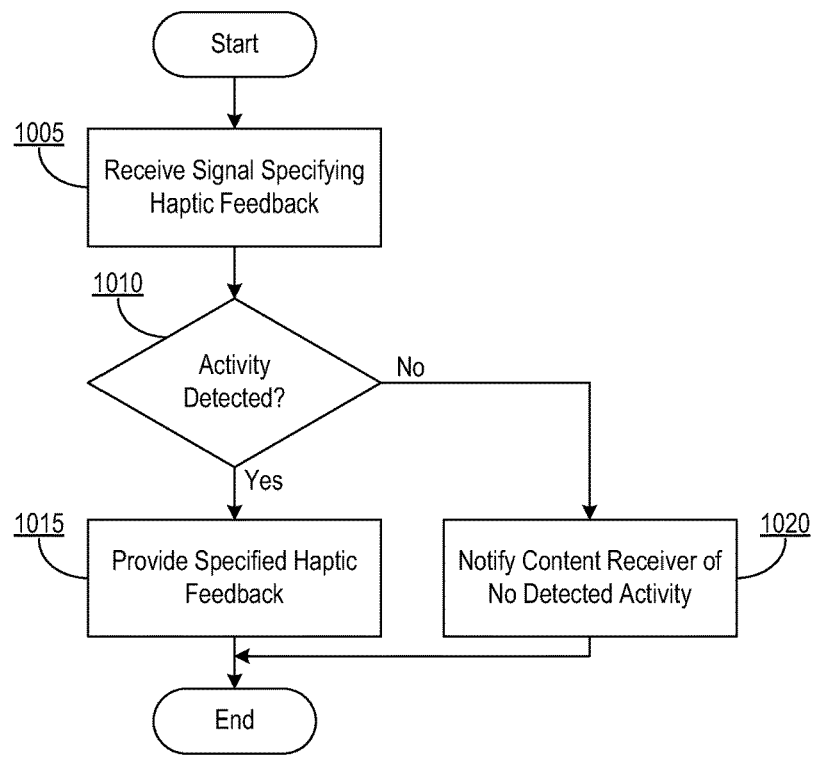
FIG. 10 illustrates an example method of providing haptic feedback based on detected activity according to one or more illustrative aspects of the disclosure.

FIG. 10 illustrates an example method of providing haptic feedback based on detected activity according to one or more illustrative aspects of the disclosure. According to one or more aspects, the example method illustrated in FIG. 10 may be performed by a computing device, such as user device 115, in order to determine whether certain types of activity are detected that are indicative of the device being in an appropriate position to provide haptic feedback. As discussed below, this determination may enable the device to selectively provide haptic feedback when a user is most likely to experience such haptic feedback.

In step 1005, a user device, such as user device 115, may receive a signal specifying one or more haptic sensations to be provided to one or more users of the device. Such a signal may, for example, be a sensation data signal, as discussed above, and may specify at least one haptic sensation to be provided to a user of the user device. Before providing such haptic sensation(s), however, the user device may determine whether it is in an appropriate position to provide haptic feedback.

In particular, in step 1010, the user device may determine whether certain types of activity are detected that are indicative of the user device being in an appropriate position to provide haptic feedback. In some embodiments, determining whether these certain types of activity are detected may include determining whether the device is currently being held by a user and/or is otherwise in contact with a user.

In these embodiments, the user device (e.g., user device 115) may capture sensor input from one or more motion sensors (e.g., accelerometers, gyroscopes, magnetometers, etc.), one or more cameras, one or more microphones, one or more pressure sensors (e.g., grip sensors), and/or one or more other sensors (e.g., one or more biometric sensors, such as a sensor configured to determine whether the sensor is in contact with a user's skin). Subsequently, in these embodiments, the user device may, for instance, analyze the captured sensor input to determine if the sensor input indicates that the device is currently being held by a user or is otherwise in contact with the user. For example, if sensor input captured via one or more accelerometers indicates that the device is not at absolute rest, the user device may determine that it is being held by a user or is otherwise in contact with a user. In other instances, other types of sensor input may be used in addition to or instead of accelerometer input to determine whether activity is detected and accordingly whether the user device is in an appropriate position to provide haptic feedback to one or more users.

If it is determined, in step 1010, that one or more types of activity are detected that are indicative of the user device being in an appropriate position to provide haptic feedback, then in step 1015, the user device may provide the haptic feedback specified in the sensation data signal. Alternatively, if it is determined that the device is not in an appropriate position to provide haptic feedback (e.g., because one or more certain types of activity are not detected), then in step 1020, the user device may notify the content receiver that activity is not detected and/or that the device is not in an appropriate position to provide haptic feedback.

Figure 11:
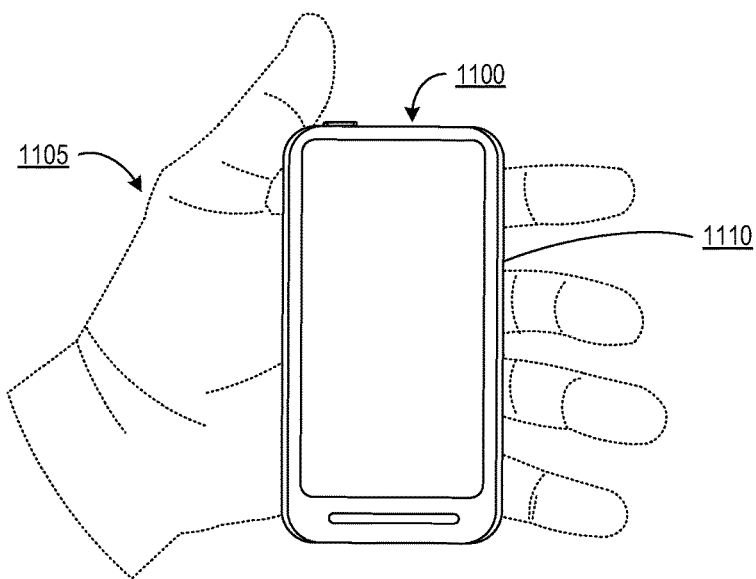
FIG. 11 illustrates an example of a device being held by a user according to one or more illustrative aspects of the disclosure.

FIG. 11 illustrates an example of a device being held by a user according to one or more illustrative aspects of the disclosure. As seen in FIG. 11, in some embodiments, a user device 1100 may be configured to be held in a user's hand 1105. Further, a user device may include one or more haptic components along an exterior surface so as to provide haptic feedback to a user. For instance, user device 1100 may include one or more haptic components along a rear surface of the device, so as to contact the surface of the user's hand 1105.

As discussed above, in some embodiments, a user device may determine whether it is in an appropriate position to provide haptic feedback to a user. This determination may, for instance, be based on sensor input captured by the user device. FIG. 11 illustrates one example of how a device can make such a determination. For instance, as seen in FIG. 11, user device 1100 may include one or more grip sensors 1110 positioned along various edges of the user device 1100. The one or more grip sensors 1110 may be configured to detect whether a user is holding the user device 1100, and thus may enable user device 1100 to determine whether it is currently being held by a user. While input from one or more grip sensors is discussed here as an example of sensor input that can be used in determining whether a device is in an appropriate position to provide haptic feedback, other input from other types of sensors may be used in addition to or instead of input from grip sensors in similar ways.

Figure 12:
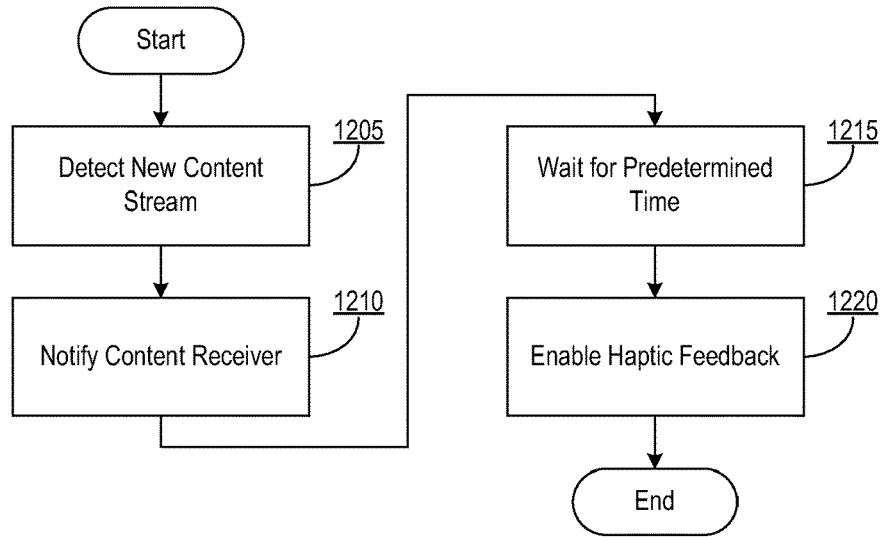
FIG. 12 illustrates an example method of detecting a new content stream that includes sensation data according to one or more illustrative aspects of the disclosure.

FIG. 12 illustrates an example method of detecting a new content stream that includes sensation data according to one or more illustrative aspects of the disclosure. According to one or more aspects, the example method illustrated in FIG. 12 may be performed by a computing device, such as user device 115, in handling transitions in content streams. For instance, as the content being received and/or decoded by a content receiver changes, a user device may detect the change in the content stream and may perform one or more steps of the example method illustrated in FIG. 12 in order to begin receiving a sensation data signal corresponding to the newly detected content stream.

In step 1205, a user device (e.g., user device 115) may detect a new content stream. For example, in step 1205, the user device may determine that a new content stream is detected based on audio data and/or video data captured by the user device, as discussed above. In some instances, a new content stream may be detected because a previous program ended or the user selected a new, different program for playback. In other instances, a new content stream may be detected because the user device has been moved from one location near one media playback device to another location near a different media playback device.

Subsequently, in step 1210, the user device may notify the content receiver that a new content stream has been detected.

For example, in step 1210, the user device may send a local content receiver one or more messages that include information identifying the new content stream, such as a title of the program, a unique identifier associated with the content stream, and/or other information. This may cause the local content receiver to provide the user device with a sensation data signal corresponding to the new content stream, similar to how the local content receiver may provide the user device with a sensation data signal in the examples discussed above.

In step 1215, the user device may wait for a predetermined amount of time (e.g., ten seconds, thirty seconds, etc.) before proceeding to step 1220, in which the user device may enable haptic feedback and begin providing haptic feedback based on the sensation data signal. By waiting for a predetermined amount of time before starting to provide haptic feedback in association with the new content stream, the user device may, for example, provide an opportunity for the user to position the device in an optimal position to receive haptic feedback. Additionally or alternatively, the user device may, for example, avoid providing haptic feedback in a situation where the user is flipping through a number of programs or channels on the media device displaying the content stream.

Figure 13:
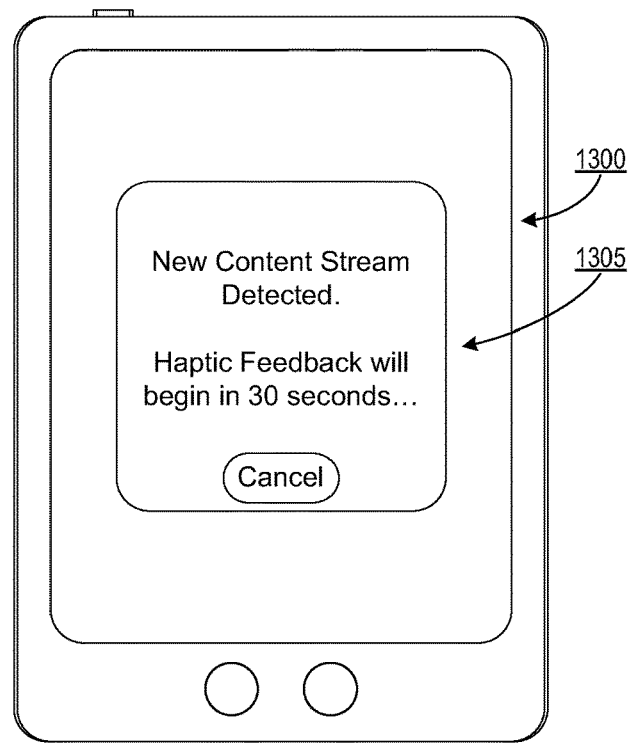
FIG. 13 illustrates an example user interface that may be displayed in detecting a new content stream that includes sensation data according to one or more illustrative aspects of the disclosure.

In some embodiments, in waiting for an amount of time to elapse before enabling haptic feedback, the user device also may display a user interface that notifies one or more users of the user device that a new content stream has been detected and that haptic feedback will soon be enabled. FIG. 13 illustrates an example of such a user interface.

In particular, FIG. 13 illustrates an example user interface 1300 that may be displayed in detecting a new content stream that includes sensation data according to one or more illustrative aspects of the disclosure. As seen in FIG. 13, user interface 1300 may include a notification 1305 that is configured to inform a user that a new content stream has been detected and/or that haptic feedback will soon be provided in connection with the new content stream. As noted above, this may, for instance, provide the user with an opportunity to position the device in an optimal position to receive haptic feedback, and/or may prevent the device from providing haptic feedback in situations where it might not be desirable to provide haptic feedback, such as where the user is flipping through various programs and/or channels.

Three-dimensional (3D) movies are becoming very popular and there are movies and theaters that may be trying to cater for newer dimensions, such as motion and olfactics. Currently, some theaters may implement motion that includes large scale vibrations (e.g., via a vibrating theater chair), but there is no deployment of localized haptics. By including such haptic feedback, a new dimension in entertainment and communication may be provided. Haptic feedback may include things that a human can feel (e.g., with their hand or hands), such as pressure, texture, pinching, heat, slip, shape, corners, and so on.

Aspects of the disclosure relate to incorporating tactile sensations into mobile devices by transmitting time-relevant haptic information incorporated into a digital movie. Transmission of haptics/tactile sensations feedback to a mobile device may be done in movie theaters, home theaters, by any device which is capable of movie playback, movie streaming, etc. This may enhance the movie viewing experience by incorporating newer dimensions that can be personalized.

According to one or more aspects, a new dimension may be added to movie entertainment by incorporating tactile feedback. Movie entertainment may become more and more interactive with the introduction of 3D graphics and newer dimensions, such as smell, vibration, motion, etc. From 2007 to 2009, there was a seven-fold increase in the number of 3D movies. However, tactile feedback could be an important component of user interactivity and is currently missing in movie entertainment. Theaters might provide vibrating chairs and/or the like, but these might not make use of all effects that can be produced in this dimension (e.g., in the dimension of tactile feedback). Tactile feedback, such as touch (e.g., scratch, poke, etc.), temperature, localized/spatial and time-variant vibration sequences, etc. could be provided.

Additionally or alternatively, beyond the third dimensions, users may expect to have other dimensions customized to their needs. For example, not everyone might like to be thrown around in a vibrating chair or be subjected to the smell of fish. In one or more arrangements, this kind of customization may be provided using a mobile device that is capable of providing and/or otherwise using tactile feedback.

In at least one arrangement, the device can download haptic feedback information based on context information, which may include, for instance, a name of a movie (or other program content) being viewed by a user, an identifier corresponding to such content, and/or other information. In some arrangements, the context information may also be automatically obtained by using indoor location (InNav) information, and the movie (or other program content) may be identified using an audio interface, such as Listen. Additionally or alternatively, haptics information can also be transmitted wirelessly, and the haptics information may be added as a dedicated channel to the audio signal (e.g., of the movie or other program content) or modulated on top of the audio signal.

In one or more arrangements, the context information may include: timing information (e.g., the start time of the movie or other program content, the elapsed time of the movie or other program content, etc., as this may ensure that the downloaded haptic information can be reproduced in a timely manner); user age group (e.g., an elderly person might want to ensure that only soft haptics be enabled on his or her device); and/or other information. In at least one implementation, the haptics-enabled mobile device may be a mobile telephone or other mobile device attached to and/or distributed prior to the movie experience.

Aspects of the disclosure thus enable and encompass using a plurality of devices that can enable haptic sensations for enhancing the movie watching experience. For example, aspects of the disclosure provide a method of transmitting a point-to-multipoint broadcast of haptic feedback (and/or information that, when received, causes one or more devices to provide haptic feedback). In one or more arrangements, a plurality of peripheral devices may download contextual and temporal haptic information related to a particular movie. Additionally or alternatively, the plurality of peripheral devices may receive haptic feedback information while watching, viewing, and/or displaying a four-dimensional (4D) movie by the mobile device. In some arrangements, the fourth dimension may incorporate spatial and time-variant haptic feedback. Additionally or alternatively, the haptic information may be encoded onto an audio signal, modulated onto an audio signal, and/or added onto a dedicated audio channel.

In one or more additional and/or alternative arrangements, the plurality of devices that can provide haptic sensations may include a mobile device. Further, the plurality of devices may include a device attached to a user's seating and/or distributed prior to the start of the movie, for example. Additionally or alternatively, customizable tactile sensation may be provided based on user preferences and/or other factors, such as age (e.g., of the user) and/or genre of the movie (or other program content).

Figure 14:
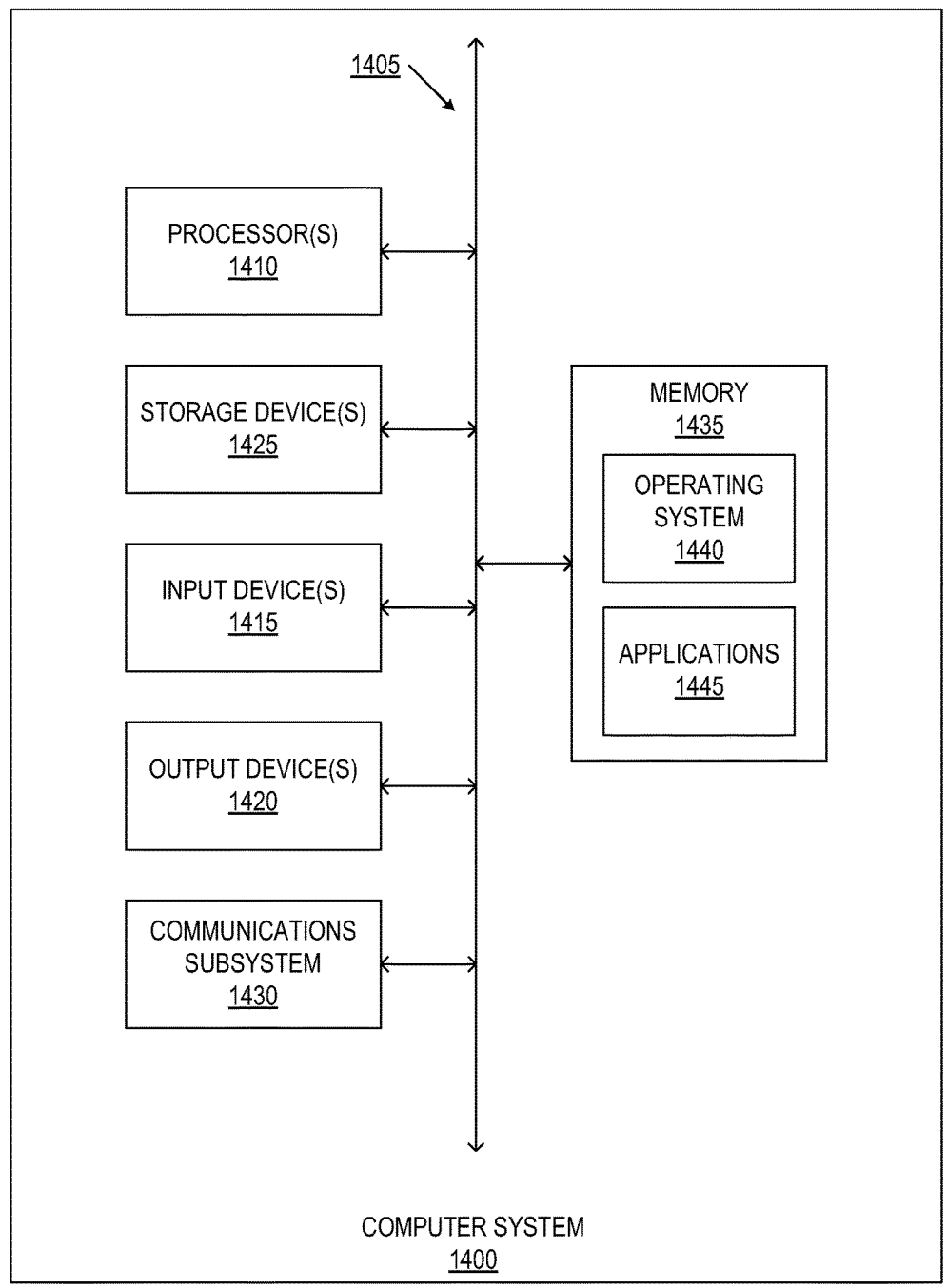
FIG. 14 illustrates an example computing system in which one or more aspects of the disclosure may be implemented.

Having described multiple aspects of using haptic technologies to provide enhanced media experiences, an example of a computing system in which various aspects of the disclosure may be implemented will now be described with respect to FIG. 14. According to one or more aspects, a computer system as illustrated in FIG. 14 may be incorporated as part of a computing device, which may implement, perform, and/or execute any and/or all of the features, methods, and/or method steps described herein. For example, computer system 1400 may represent some of the components of a hand-held device. A hand-held device may be any computing device with an input sensory unit, such as a camera and/or a display unit. Examples of a hand-held device include but are not limited to video game consoles, tablets, smart phones, and mobile devices. In one embodiment, the computer system 1400 is configured to implement the user device 115 described above. FIG. 14 provides a schematic illustration of one embodiment of a computer system 1400 that can perform the methods provided by various other embodiments, as described herein, and/or can function as the host computer system, a remote kiosk/terminal, a point-of-sale device, a mobile device, a set-top box, and/or a computer system. FIG. 14 is meant only to provide a generalized illustration of various components, any and/or all of which may be utilized as appropriate. FIG. 14, therefore, broadly illustrates how individual system elements may be implemented in a relatively separated or relatively more integrated manner.

The computer system 1400 is shown comprising hardware elements that can be electrically coupled via a bus 1405 (or may otherwise be in communication, as appropriate). The hardware elements may include one or more processors 1410, including without limitation one or more general-purpose processors and/or one or more special-purpose processors (such as digital signal processing chips, graphics acceleration processors, and/or the like); one or more input devices 1415, which can include without limitation a camera, a mouse, a keyboard and/or the like; and one or more output devices 1420, which can include without limitation a display unit, a printer and/or the like.

The computer system 1400 may further include (and/or be in communication with) one or more non-transitory storage devices 1425, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1400 might also include a communications subsystem 1430, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 1430 may permit data to be exchanged with a network (such as the network described below, to name one example), other computer systems, and/or any other devices described herein. In many embodiments, the computer system 1400 will further comprise a non-transitory working memory 1435, which can include a RAM or ROM device, as described above.

The computer system 1400 also can comprise software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIGS. 2, 3, 5, 8, 10, and 12, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1425 described above. In some cases, the storage medium might be incorporated within a computer system, such as computer system 1400. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1400) to perform methods in accordance with the disclosure. For example, some or all of the procedures of the described methods may be performed by the computer system 1400 in response to processor 1410 executing one or more sequences of one or more instructions (which might be incorporated into the operating system 1440 and/or other code, such as an application program 1445) contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processor(s) 1410 to perform one or more procedures of the methods described herein, for example a method described with respect to FIGS. 2, 3, 5, 8, 10, and 12.

The terms "machine-readable medium" and "computer-readable medium," as used herein, refer to any medium that participates in providing data that causes a machine to operate in a specific fashion. In an embodiment implemented using the computer system 1400, various computer-readable media might be involved in providing instructions/code to processor(s) 1410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1425. Volatile media include, without limitation, dynamic memory, such as the working memory 1435. Transmission media include, without limitation, coaxial cables, copper wire and fiber optics, including the wires that comprise the bus 1405, as well as the various components of the communications subsystem 1430 (and/or the media by which the communications subsystem 1430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1400. These signals, which might be in the form of electromagnetic signals, acoustic signals, optical signals and/or the like, are all examples of carrier waves on which instructions can be encoded, in accordance with various embodiments of the invention.

The communications subsystem 1430 (and/or components thereof) generally will receive the signals, and the bus 1405 then might carry the signals (and/or the data, instructions, etc. carried by the signals) to the working memory 1435, from which the processor(s) 1410 retrieves and executes the instructions. The instructions received by the working memory 1435 may optionally be stored on a non-transitory storage device 1425 either before or after execution by the processor(s) 1410.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method comprising:
    establishing, by a computing device, a connection with a local content receiver providing a content stream for display;
    receiving, by the computing device, from the local content receiver a sensation data signal associated with the content stream being provided for display, the sensation data signal including sensation data information that specifies one or more haptic effects to be provided while the content stream is displayed, wherein the sensation data information includes one or more markers within the content stream associating the one or more haptic effects with particular points of the content stream provided by the local content receiver;
    detecting, by the computing device, that the content stream is being provided for display;
    detecting, by the computing device, a particular portion of the content stream being provided for display while the content stream is being provided for display by the local content receiver, the particular portion being associated with the one or more haptic effects according to the sensation data information; and
    providing, by the computing device, the one or more haptic effects in synchronization with the particular portion of the content stream.

2. The method of claim 1, wherein establishing the connection with the local content receiver further includes:
    detecting the local content receiver on a wireless area network; and
    sending registration information to the local content receiver.

3. The method of claim 2, wherein the registration information includes device capability information.

4. The method of claim 1, further comprising:
notifying, by the computing device, the local content receiver of haptic feedback capabilities of the computing device; and
wherein detecting that the content stream is being provided for display occurs prior to receiving the sensation data signal and includes capturing audio data or video data corresponding to a playback of the content stream.

5. The method of claim 1, further comprising:
prior to providing the one or more haptic effects, determining whether activity is detected.

6. The method of claim 5, wherein determining whether activity is detected includes determining whether the computing device is in motion or at rest.

7. The method of claim 5, wherein determining whether activity is detected includes determining whether the computing device is being held by a user.

8. The method of claim 1, further comprising:
detecting a new content stream associated with a second media content item; and
providing one or more additional haptic effects based on data received from the local content receiver.

9. The method of claim 8, further comprising:
prior to providing the one or more additional haptic effects, waiting for a predetermined amount of time.

10. The method of claim 1, wherein the one or more haptic effects have a logical relationship to associated images or associated audio of the content stream and are synchronized to occur during a display of the associated images of the content stream or a projection of the associated audio of the content stream.

11. At least one non-transitory computer-readable medium having computer-executable instructions stored thereon that, when executed, cause a computing device to:
establish, by a computing device, a connection with a local content receiver providing a content stream for display;
receive, by the computing device, from the local content receiver a sensation data signal associated with the content stream being provided for display, the sensation data signal including sensation data information that specifies one or more haptic effects to be provided while the content stream is displayed, wherein the sensation data information includes one or more markers within the content stream associating the one or more haptic effects with particular points of the content stream provided by the local content receiver;
detect, by the computing device, that the content stream is being provided for display;
detect, by the computing device, a particular portion of the content stream being provided for display while the content stream is being provided for display by the local content receiver, the particular portion being associated with the one or more haptic effects according to the sensation data information; and
provide, by the computing device, the one or more haptic effects in synchronization with the particular portion of the content stream.

12. The at least one non-transitory computer-readable medium of claim 11, wherein establishing the connection with the local content receiver further includes:
detecting the local content receiver on a wireless area network; and
sending registration information to the local content receiver.

13. The at least one non-transitory computer-readable medium of claim 12, wherein the registration information includes device capability information.

14. The at least one non-transitory computer-readable medium of claim 11, further comprising:
notify, by the computing device, the local content receiver of haptic feedback capabilities of the computing device; and
wherein detecting that the content stream is being provided for display occurs prior to receiving the sensation data signal and includes capturing audio data or video data corresponding to a playback of the content stream.

15. The at least one non-transitory computer-readable medium of claim 11, having additional computer-executable instructions stored thereon that, when executed, further cause the computing device to:
prior to providing the one or more haptic effects, determine whether activity is detected.

16. The at least one non-transitory computer-readable medium of claim 15, wherein determining whether activity is detected includes determining whether the computing device is in motion or at rest.

17. The at least one non-transitory computer-readable medium of claim 15, wherein determining whether activity is detected includes determining whether the computing device is being held by a user.

18. The at least one non-transitory computer-readable medium of claim 11, having additional computer-executable instructions stored thereon that, when executed, further cause the computing device to:
detect a new content stream associated with a second media content item; and
provide one or more additional haptic effects based on data received from the local content receiver.

19. The at least one non-transitory computer-readable medium of claim 18, having additional computer-executable instructions stored thereon that, when executed, further cause the computing device to:
prior to providing the one or more additional haptic effects, wait for a predetermined amount of time.

20. The at least one non-transitory computer-readable medium of claim 11, wherein the one or more haptic effects have a logical relationship to associated images or associated audio of the content stream and are synchronized to occur during a display of the associated images of the content stream or a projection of the associated audio of the content stream.

21. An apparatus comprising:
at least one processor; and
memory storing computer-readable instructions that, when executed by the at least one processor, cause the apparatus to:
establish, by a computing device, a connection with a local content receiver providing a content stream for display;
receive, by the computing device, from the local content receiver a sensation data signal associated with the content stream being provided for display, the sensation data signal including sensation data information that specifies one or more haptic effects to be provided while the content stream is displayed, wherein the sensation data information includes one or more markers within the content stream associating the one or more haptic effects with particular points of the content stream provided by the local content receiver;

detect, by the computing device, that the content stream is being provided for display;

detect, by the computing device, a particular portion of the content stream being provided for display while the content stream is being provided for display by the local content receiver, the particular portion being associated with the one or more haptic effects according to the sensation data information; and provide, by the computing device, the one or more haptic effects in synchronization with the particular portion of the content stream.

22. The apparatus of claim 21, wherein establishing the connection with the local content receiver further includes:
detecting the local content receiver on a wireless area network; and
sending registration information to the local content receiver.

23. The apparatus of claim 22, wherein the registration information includes device capability information.

24. The apparatus of claim 21, further comprising:
notify, by the computing device, the local content receiver of haptic feedback capabilities of the computing device; and
wherein detecting that the content stream is being provided for display occurs prior to receiving the sensation data signal and includes capturing audio data or video data corresponding to a playback of the content stream.

25. The apparatus of claim 21, wherein the memory stores additional computer-readable instructions that, when executed by the at least one processor, further cause the apparatus to:
prior to providing the one or more haptic effects, determine whether activity is detected.

26. The apparatus of claim 25, wherein determining whether activity is detected includes determining whether the apparatus is in motion or at rest.

27. The apparatus of claim 25, wherein determining whether activity is detected includes determining whether the apparatus is being held by a user.

28. The apparatus of claim 21, wherein the memory stores additional computer-readable instructions that, when executed by the at least one processor, further cause the apparatus to:
detect a new content stream associated with a second media content item;
and
provide one or more additional haptic effects based on data received from the local content receiver.

29. The apparatus of claim 28, wherein the memory stores additional computer-readable instructions that, when executed by the at least one processor, further cause the apparatus to:
prior to providing the one or more additional haptic effects, wait for a predetermined amount of time.

30. The apparatus of claim 21, wherein the one or more haptic effects have a logical relationship to associated images or associated audio of the content stream and are synchronized to occur during a display of the associated images of the content stream or a projection of the associated audio of the content stream.

31. A system comprising:
means for establishing, by a computing device, a connection with a local content receiver providing a content stream for display;

means for receiving, by the computing device, from the local content receiver a sensation data signal associated with the content stream being provided for display, the sensation data signal including sensation data information that specifies one or more haptic effects to be provided while the content stream is displayed, wherein the sensation data information includes one or more markers within the content stream associating the one or more haptic effects with particular points of the content stream provided by the local content receiver;

means for detecting, by the computing device, that the content stream is being provided for display;

means for detecting, by the computing device, a particular portion of the content stream being provided for display while the content stream is being provided for display by the local content receiver, the particular portion being associated with the one or more haptic effects according to the sensation data information; and means for providing, by the computing device, the one or more haptic effects in synchronization with the particular portion of the content stream.

32. The system of claim 31, wherein the means for establishing the connection with the local content receiver further includes:
means for detecting the local content receiver on a wireless area network; and
means for sending registration information to the local content receiver.

33. The system of claim 32, wherein the registration information includes device capability information.

34. The system of claim 31, further comprising:
means for notifying, by the computing device, the local content receiver of haptic feedback capabilities of the computing device;
wherein the means for detecting that the content stream is being provided for display occurs prior to receiving the sensation data signal and includes capturing audio data or video data corresponding to a playback of the content stream.

35. The system of claim 31, further comprising:
means for determining whether activity is detected prior to providing the one or more haptic effects.

36. The system of claim 35, wherein the means for determining whether activity is detected includes means for determining whether the system is in motion or at rest.

37. The system of claim 35, wherein the means for determining whether activity is detected includes means for determining whether the system is being held by a user.

38. The system of claim 31, further comprising:
means for detecting a new content stream associated with a second media content item;
and
means for providing one or more additional haptic effects based on data received from the local content receiver.

39. The system of claim 38, further comprising:
means for waiting for a predetermined amount of time prior to providing the one or more additional haptic effects.

40. The system of claim 31, wherein the one or more haptic effects have a logical relationship to associated images or associated audio of the content stream and are synchronized to occur during a display of the associated images of the content stream or a projection of the associated audio of the content stream.

* * * * *